United States Patent
Ohno et al.

(10) Patent No.: US 6,939,825 B1
(45) Date of Patent: Sep. 6, 2005

(54) CARRIER FOR CATALYST AND METHOD FOR PREPARING THE SAME

(75) Inventors: Kazushige Ohno, Gifu (JP); Teruo Komori, Gifu (JP); Akira Hasegawa, Aomori (JP); Noriyoshi Kakuta, Aichi (JP)

(73) Assignee: Ibiden Co., Ltd., Gifu (JP)

( * ) Notice: Subject to any disclaimer, the term of this patent is extended or adjusted under 35 U.S.C. 154(b) by 371 days.

(21) Appl. No.: 09/926,795

(22) PCT Filed: Jun. 22, 2000

(86) PCT No.: PCT/JP00/04084

§ 371 (c)(1),
(2), (4) Date: Dec. 20, 2001

(87) PCT Pub. No.: WO00/78451

PCT Pub. Date: Dec. 28, 2000

(30) Foreign Application Priority Data

Jun. 23, 1999 (JP) .................................. 11/177503
Sep. 30, 1999 (JP) .................................. 11/280072

(51) Int. Cl.$^7$ .......................... B01J 21/04; B01J 23/02; B01J 21/00; B01J 23/00
(52) U.S. Cl. ...................... 502/439; 502/263; 502/355; 502/407; 502/415; 502/527.19; 423/326; 423/327.1; 423/327.2; 423/328.1; 423/335
(58) Field of Search ................ 502/263, 355, 502/407, 415, 439, 527.19; 423/324, 325, 423/326, 327.1, 327.2, 328.1, 335

(56) References Cited

U.S. PATENT DOCUMENTS

| | | | | |
|---|---|---|---|---|
| 3,767,453 A | * | 10/1973 | Hoekstra | 427/243 |
| 4,102,819 A | | 7/1978 | Petrow et al. | |
| 4,399,185 A | | 8/1983 | Petrow | |
| 4,483,940 A | * | 11/1984 | Ono et al. | 502/159 |
| 4,572,904 A | * | 2/1986 | Onal | 502/333 |
| 4,702,897 A | * | 10/1987 | Onal | 423/213.5 |
| 4,749,671 A | | 6/1988 | Saito et al. | |
| 4,919,902 A | * | 4/1990 | Bricker et al. | 426/213.5 |
| 5,346,722 A | | 9/1994 | Beauseigneur et al. | |
| 5,776,419 A | | 7/1998 | Ihara et al. | |

FOREIGN PATENT DOCUMENTS

EP    0625371    11/1994

(Continued)

OTHER PUBLICATIONS

English Language Abstract of JP 61-7860.

(Continued)

*Primary Examiner*—Cam N. Nguyen
(74) *Attorney, Agent, or Firm*—Greenblum & Bernstein, P.L.C.

(57) ABSTRACT

It is to provide a catalyst carrier having large pore size and porosity and a small pressure loss.

The catalyst carrier is characterized by covering a surface of each particle in a silicon-containing ceramic carrier with alumina thin film, and is produced by immersing a carrier having an oxide film of a silicide in its surface in a solution of aluminum containing metal compound, drying by heating, calcining, subjecting to an immersion treatment in hot water and thereafter firing.

18 Claims, 6 Drawing Sheets

FOREIGN PATENT DOCUMENTS

| | | |
|---|---|---|
| EP | 0766993 | 4/1997 |
| JP | 57-10335 | 1/1982 |
| JP | 57144039 | 9/1982 |
| JP | 61-7860 | 3/1986 |
| JP | 63-218254 | 9/1988 |
| JP | 4-40237 | 2/1992 |
| JP | 5-68892 | 3/1993 |
| JP | 6-63423 | 3/1994 |
| JP | 6-24636 | 4/1994 |

OTHER PUBLICATIONS

English Language Abstract of JP 57-144039.
English Language Abstract of JP 6-24636.
English Language Abstract of JP 57-10335.
English Language Abstract of JP 6-63423.
English Language Abstract of JP 5-68892.
English Language Abstract of JP 4-40237.
English Language Abstract of JP 63-218254.

* cited by examiner (a)

(b)

(c)

ΔP = ΔP1+ΔP2+ ΔP3+ΔP4    (Formula 1)

ΔP1: Resistance based on the narrowing of path opening

ΔP2: Resistance in passing through fine tube

ΔP3: Resistance in passing through wall

ΔP4: Resistance in passing through deposited PM

<< 1000°C 30h >>

No thin film

Invention Example (×10k)  (×30k)

CARRIER FOR CATALYST AND METHOD FOR PREPARING THE SAME

TECHNICAL FIELD

This invention relates to a catalyst carrier for the purification of an exhaust gas and a method of producing the same, and more particularly proposes a catalyst carrier capable of efficiently conducting oxidation-removal of carbon monoxide (CO) and hydrocarbon (HC) included in the exhaust gas and reducing-removal of nitrogen oxide (NOx) and being small in the pressure loss and having a high gathering efficiency of diesel particulate.

BACKGROUND ART

Heretofore, there is a catalyst carrier for the purification of an exhaust gas from an automobile, e.g. a catalyst carrier for purifying an exhaust gas from a diesel engine as shown in FIGS. 1(a) and (b). As a typical example of such a catalyst carrier, there is a honeycomb type filter 100 by making each cell 101 as a path for an exhaust gas in a honeycomb shape from a porous silicon carbide sintered body having excellent heat resistance and thermal conductivity and alternately clogging these cells 101. This type of the honeycomb type filter 100 is connected to an exhaust side of a diesel engine and has a structure that PM (particulate matter) deposited on the filter, HC, CO and the like are removed by oxidation decomposition.

As such a carrier for the catalyst, it is known that a carrying layer made of γ-alumina is formed on a surface of a filtering wall (cell wall) 102 of a honeycomb-shaped heat-resistant carrier made of, for example, cordierite and a noble metal catalyst such as Pt, Pd, Rh or the like is carried on the carrying layer. For example, JP-A-5-68892 discloses a catalyst carrier obtained by adding and mixing γ-alumina with an inorganic binder and pulverizing them to obtain a fine powder slurry and then uniformly spraying the slurry onto a surface (wall face) of a honeycomb filter made of cordierite to form so-called wash coat alumina layer 103.

The alumina layer 103 formed by the conventional technique or wash coated (wash coat alumina layer) is shaped by a thin film uniformly covering the wall face of the filtering wall 102 as shown in FIG. 2(a) and has a fine pore structure as shown by a partial enlarged view in FIG. 2(b). The pore size in such a fine pore structure is mainly 20–500 angstrom and a specific surface area is usually 50–300 m$^2$/g. And also, the alumina layer 103 acts as a catalyst carrying layer dispersingly supporting a catalyst such as a noble metal or the like on its surface, so that it is required to enlarge the surface area and have a certain thickness (about 50–100 μm).

However, the wash coated alumina layer 103 is small in the pore size and porosity and large in the permeation resistance, so that there is a problem that pressure loss considerably increases as compared with the carrier having no alumina layer.

Furthermore, the wash coated alumina layer 103 is poor in the adhesion property because it is uniformly coated onto the surface of the carrier as a filtering wall 102. Therefore, when the deposited ash is cleaned after the purification of the exhaust gas, the alumina layer 103 is feared to be simply peeled. And also, there is a problem that the wash coated alumina layer 103 is poor in the heat resistance because such a layer has a fine pore structure as mentioned above but is as small as 20–500 angstroms in the pore size and proceeds the sintering when being exposed to a higher temperature for a long time to cause a phase transformation into α-phase to lower the surface area. Furthermore, since the surface area is small, a distance between noble metal particles carried on the alumina is small and hence the lowering of the surface area is caused as the sintering proceeds and there is a problem of lowering the catalytic action itself.

As seen from the above, it is important that the surface of the carrier, particularly the surface of the alumina layer covering the surface thereof is maintained at the high temperature for the long time as an important property of the catalyst carrier.

It is, therefore, an object of the invention to propose a catalyst carrier being large in the pore size and porosity and small in the pressure loss though an alumina thin film is formed on the surface and a method of producing the same.

It is another object of the invention to propose a catalyst carrier having a large surface area of an alumina layer as a catalyst carrying layer and an excellent heat resistance and a method of producing the same.

DISCLOSURE OF THE INVENTION

As means for solving the above problems, the invention adopts a catalyst carrier characterized in that a surface of each particle of silicon-containing ceramic carrier such as silicon carbide or silicon nitride is covered with a thin film of alumina.

The silicon-containing ceramic carrier is favorable to be constructed with a carrier of silicide including a non-oxide ceramic such as silicon carbide or silicon nitride and an oxide ceramic such as sialon, mullite or cordierite.

The silicon-containing ceramic carrier is characterized by being any of a porous body, fiber shaped body and pellet shaped body. Preferably, it is formed by a honeycomb-like porous silicon carbide sintered body having a SiO$_2$ layer on its surface wherein an amount of such a layer occupied in the carrier is 0.001–20 wt %.

In the invention, it is a preferable embodiment that the alumina thin film covering each particle surface of the ceramic carrier indicates a transplant structure of bristling with fine fibers having a diameter: 2–50 nm, a length: 20–300 nm and a ratio of total length/diameter of 5–100 at a microscopic section and has a specific surface area of 50–300 m$^2$/g, and that the alumina thin film is an amount of 0.1–15 wt % per the carrier as an alumina amount.

The catalyst carrier can be produced by forming an alumina thin film on a surface of a silicon-containing ceramic carrier through the following steps (a)–(e).
(a) Solution immersing step: the carrier is immersed in a solution of aluminum containing metal compound.
(b) Drying step: the carrier is heated and dried.
(c) Calcining step: the carrier is heated and fired at a temperature of not lower than 300–500° C. to form amorphous alumina thin film.
(d) Heat treating step: the carrier is immersed in a hot water of 100° C. and dried.
(e) Finish firing step: it is fired at 500–1200° C.

And also, another production method of the invention is characterized by forming an alumina thin film on a surface of a silicon-containing ceramic carrier through the following steps (a)–(f).
(a) Preliminary treating step: the silicide ceramic carrier is heated to a temperature of 1000–1500° C. to form an oxide film of the silicide.
(b) Solution immersing step: the carrier is immersed in a solution of aluminum containing metal compound.
(c) Drying step: the carrier is heated and dried.

(d) Calcining step: the carrier is heated and fired at a temperature of not lower than 300–500° C. to form amorphous alumina thin film.

(e) Heat treating step: the carrier is immersed in a hot water of 100° C. and dried.

(f) Finish firing step: it is fired at 500–1200° C.

Moreover, the component composition, structure and properties of the silicon-containing ceramic carrier are as mentioned above in each of the above production methods, and also the alumina thin film covering the surface of each ceramic particle is the same as mentioned above.

BEST MODE FOR CARRYING OUT THE INVENTION

A catalyst carrier 1 according to the invention is used by forming a filtering wall 2 with a porous silicon-containing ceramic sintered body preferably typifying silicon carbide (hereinafter referred to as porous SiC sintered body, which is not, of course, restricted thereto), covering a surface of the filtering wall 2, particularly each surface of SiC particles with an alumina thin film 3 as a catalyst carrying layer at a given thickness, and carrying Pt or Pd on the alumina thin film 3.

Figure 1:
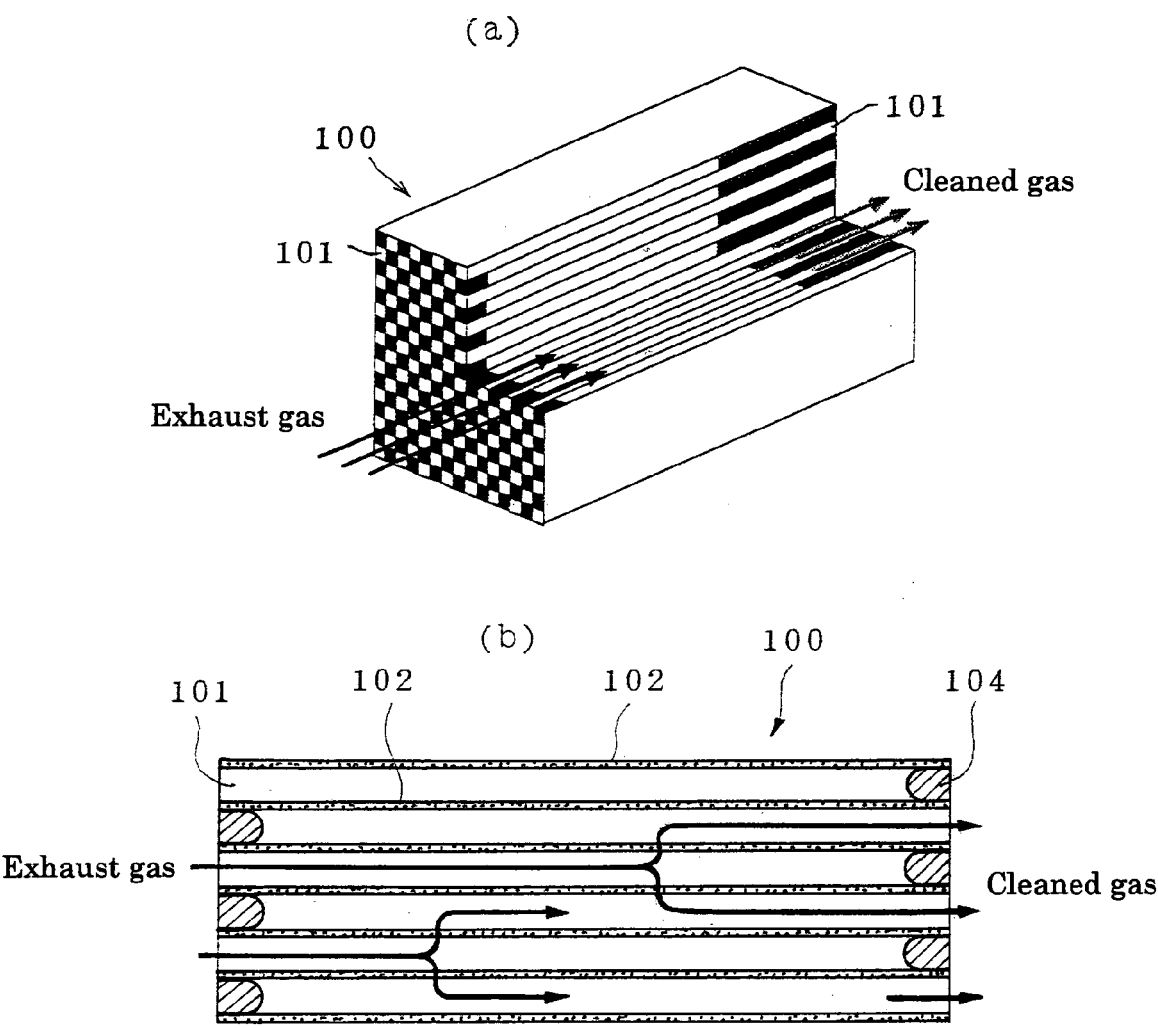
FIG. 1 is a schematic view of a typical embodiment of the catalyst carrier.

As the catalyst carrier used in the invention can be used ones obtained by kneading powder of an oxide ceramic such as silicon carbide powder, silicon nitride powder or the like, or powder of a silicon-containing ceramic belonging to an oxide such as sialon, mullite, cordierite or the like with an organic binder, a lubricant, a plasticizer and water and shaping through extrusion and sintering. In this way, a wall-flow honeycomb type filter is formed as shown in FIG. 1.

An example using SiC sintered body as the silicon-containing ceramic carrier is explained below.

The catalyst carrier (filter) 1 is constructed with SiC sintered body wherein plural through-holes (cells) are regularly formed in an approximately square shape at its section along an axial line direction thereof. The cells are separated from each other through filtering walls (hereinafter referred to as cell wall) 2, while opening portion of each cell is sealed at its one edge face side with a sealing body 104 and the other edge face thereof is opened, so that the carrier as a whole has a structure that the opening portions and sealed portions of the cells indicate a checkered pattern. In the carrier(filter) 1 made of the SiC sintered body are formed many cells 101 of a rectangular form at section. In other words, the filter has a honeycomb structure.

Moreover, the density of the cells 101 is about 200 cells/square inch. That is, about a half of many cells is opened at their end faces of upstream side and the remaining cells are opened at their end faces of downstream side, and the thickness of the cell wall 2 separating the cells 101 is set to be about 0.4 mm.

Figure 3:
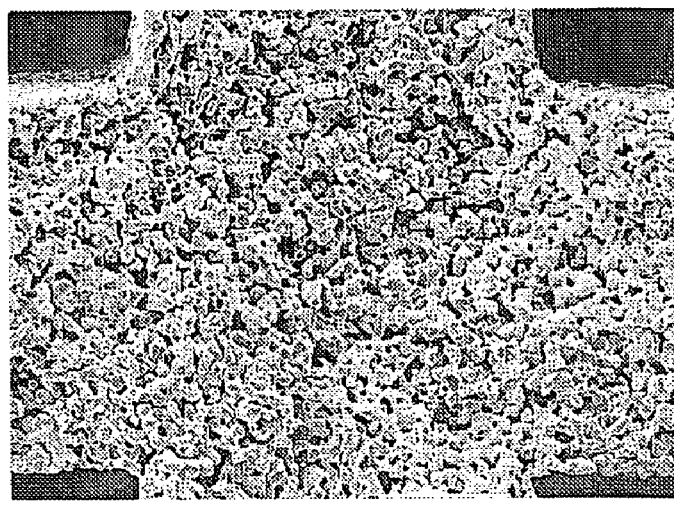
FIG. 3(a) is an enlarged photograph of a filtering wall, (b) is an outline thereof, and (c) is a diagrammatically section view of an alumina thin film.
Figure 3:
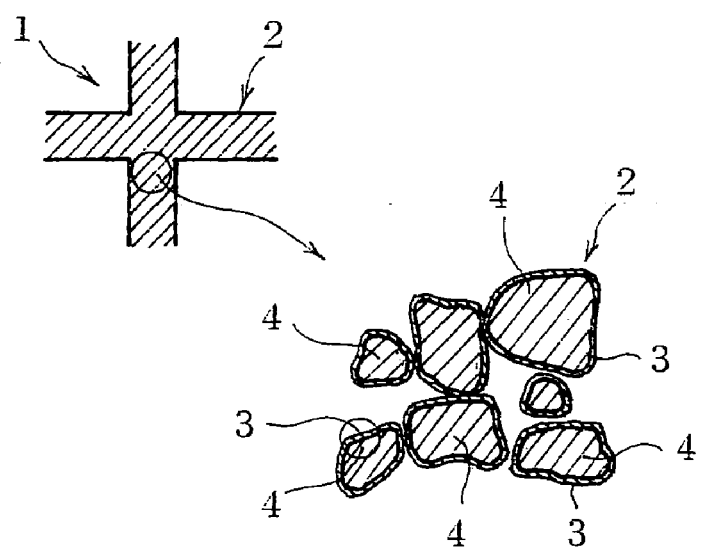
Figure 3:
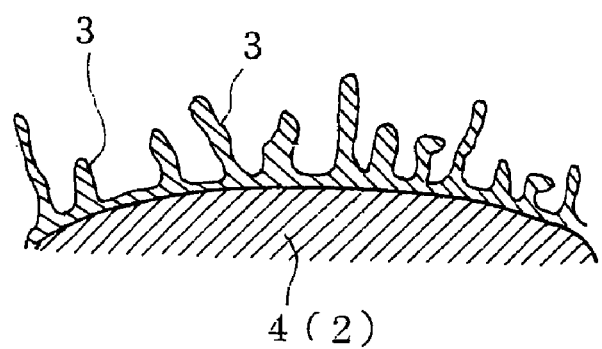

The thus obtained catalyst carrier made of SiC sintered body is a so-called wall-flow type structure partitioned by porous cell walls 2 as shown in FIG. 3(a). In this case, it is favorable that an average pore size in the pores of the porous cell wall 2 is within a range of 5 $\mu$m–15 $\mu$m as measured by a mercury press-fitting process. When the pore size is represented by common logarithms, it is favorable that a value of standard deviation in the pore size distribution is not more than 0.20.

When the cell wall 2 has such a pore size, it is favorable to catch fine particulates. That is, when the average pore size of the cell wall 2 is set to the above range, diesel particulates can surely be caught. On the other hand, when the pore size of the cell wall 2 is less than 5 $\mu$m, the pressure loss when the exhaust gas passes through the inner wall becomes extremely large and the stop of the engine is apt to be caused. And also, when the average value of the pore size exceeds 15 $\mu$m, fine particulates can not be caught efficiently.

In the production of such a catalyst carrier, a starting material is formed, for example, by compounding 70 parts by weight of silicon carbide powder having an average particle size of about 10 $\mu$m with about 30 parts by weight of silicon carbide powder having an average particle size of about 0.5 $\mu$m, about 6 parts by weight of methylcellulose as a binder based on 100 parts by weight of the ceramic powder, and about 25 parts by weight of a dispersant of an organic solvent and water based on 100 parts by weight of the ceramic powder. After kneading, the compounded mixture is shaped into a honeycomb form by extrusion shaping. Thereafter, cells 101 are partly sealed into a checkered pattern. Then, the shaped body is dried and degreased and fired at 2200° C. in an inert atmosphere for 4 hours to obtain a desired catalyst carrier.

In the invention, a most characteristic feature lies in that the surfaces of the inner walls of the catalyst carrier 1 or cell walls 2 are covered with an alumina thin film. More concretely, the surface of each particle in the SiC sintered body constituting the cell wall 2 is individually covered with the alumina thin film.

Figure 2:
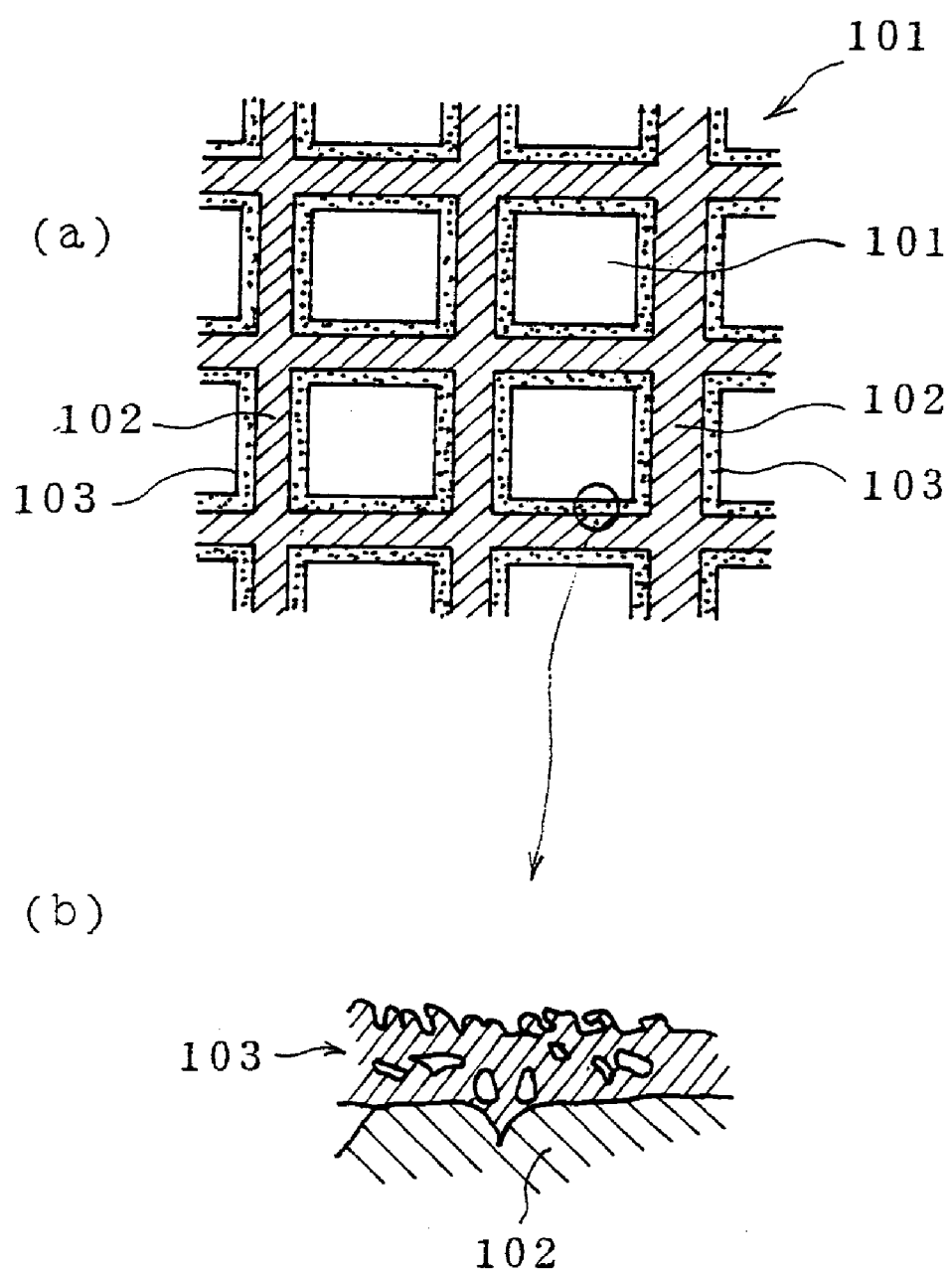
FIG. 2 is an outline of the conventional wash coat alumina layer.

FIG. 2(b) shows a conventional technique that the surface of the cell wall 102 is evenly covered with the alumina layer 103 by a wash coat process. On the other hand, FIG. 3(b), (c) shows an embodiment of the invention, wherein each surface of SiC particles 4 constituting the cell wall 2 is individually covered with the alumina thin film 3.

Thus, the film carrying the catalyst inherent to the invention is not simply a case that the surface of the cell wall 2 as a filtering wall for exhaust gas is uniformly covered with the alumina layer 103 as is usual, but is a case that the surface of each SiC particles 4 constituting the cell wall 2 is individually covered with the alumina thin film 3. In the invention, therefore, the pores of the cell wall 2 itself are not completely closed and can be maintained at a state near to that prior to the covering, so that the pressure loss is considerably small as compared with the conventional alumina layer 103. Furthermore, the heat resistance is excellent but also the cleaning resistance is excellent because the alumina thin film 3 covers the individual SiC particle itself and is never peeled off from the cell wall in, for example, the cleaning.

The pressure loss characteristic, heat resistance and cleaning resistance of the catalyst carrier according to the invention will be described below.

As to Pressure Loss Characteristic

Figure 4:
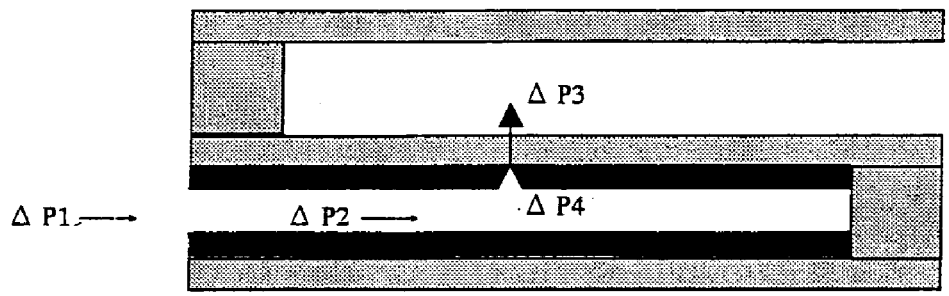
FIG. 4 is a schematic view illustrating a pressure loss characteristic.

In general, the pressure loss characteristic when the exhaust gas passes through the cell wall as a filtering wall is considered as follows. That is, the pressure loss when a diesel exhaust gas passes through the catalyst carrier (filter) constituted with the above catalyst carrier can be shown in FIG. 4. In this case, each of the resistances $\Delta P1$, $\Delta P2$, $\Delta P3$ is dependent upon the cell structure of the filter and is a constant value $\Delta pi=(\Delta P1+\Delta P2+\Delta P3)$ not depending upon the lapse of time such as deposition of diesel particulates and the like, which is called as an initial pressure loss. And also, $\Delta P4$ is a resistance when the exhaust gas passes through the deposited diesel particulates, which is a value corresponding to 2–3 or more times of the initial pressure loss.

The surface area of the carrier having a cell structure of 14/200 is 8.931 $cm^2/cm^3$ and the density of the carrier is 0.675 $g/cm^3$, so that the surface of the cell wall 2 is 0.0013 $m^2/g$. On the other hand, the surface area of the pore in the cell wall 2 is 0.12 $m^2/g$ as measured by a mercury porosimeter, which is about 100 times of the cell wall surface. This shows that in case of covering the surface of the cell wall with the same weight of alumina, the thickness of alumina can be rendered into 1/100 in the covering of individual surface of the particles constituting the cell wall as compared with the uniform covering of cell wall surface.

That is, when the alumina thin film is formed by the conventional technique such as wash coat, in order to coat about 3 wt % of alumina required for the activity of the catalyst, the thickness of alumina layer is required to be 50 $\mu m$. In this case, resistance for passing through the alumina layer is plus in addition to the resistance $\Delta P3$ passing through the cell wall as the pressure loss, so that the opening is made further small and $\Delta P1$ becomes large. As a result, the pressure loss becomes considerably large as compared with that of a filter not containing alumina coat. This tendency becomes more remarkable when the particulates are deposited on the filter.

In this point, in order to coat about 3 wt % of alumina required for the activity of the catalyst in the invention, the thickness of the alumina coat layer formed on the surface of each SiC particle constituting the cell wall is about 0.5 $\mu m$ at maximum. In this case, the resistance passing through the cell wall $\Delta P3$ slightly increases as the pressure loss, but the other pressure loss can substantially be ignored, so that the pressure loss characteristic is considerably improved as compared with the wash coat alumina layer.

Next, alumina has generally a high specific surface area and is preferable to be used as a film carrying the catalyst. Particularly, since it is desired to develop a catalyst stably operating at a higher temperature and having a high heat resistance at the present, a carrying film of alumina is required to have a higher heat resistance accompanied therewith.

For this end, according to the invention, the shape of each alumina particle is rendered into a fine fibrous shape in order to improve the heat resistance of alumina. Thus, there is adopted a method wherein the contact point between the alumina particles can be decreased and hence the particle growth is controlled through the lowering of the sintering rate to increase the specific surface area.

Namely, in the alumina thin film according to the invention, the microsection shape indicates a transplant structure of bristling alumina particles in fine fibrous form, and hence the contact point between the adjoining alumina fine fibers is decreased to considerably improve the heat resistance.

And also, in the invention, Si is fed from SiC or $SiO_2$ existing on a surface layer of SiC during the heat treatment and plays a role of shutting a mass transfer path to improve the heat resistance. According to the inventors' studies, it has been confirmed that when SiC is intentionally treated at a higher temperature to from an oxide film, the heat resistance is further improved.

Then, the cleaning resistance will be described.

The particulate deposited on the surface of the cell wall mainly consists of carbon, which can be removed through oxidation by a method such as burning or the like. However, there is a substance remaining as ash after the burning. It is an ash formed by oxidizing a compound of Ca, Mg, Zn or the like added for giving a role as a neutralizing agent or a lubricant in an engine oil or changing into a sulfate, or an ash formed by depositing a catalyst such as $CeO_2$, CuO or the like previously incorporated in a fuel for burning carbon onto the surface of the filter together with particulates. It is required to clean these ashes by means of a high pressure water or the like because they deposit during the running of the vehicle for a long time and the pressure loss of the filter increases. In this case, it has been confirmed that the ash can be removed by cleaning at a pressure of not less than 30 $kg/cm^2$.

In this point, when the uniform alumina film is coated onto the surface of the cell wall by wash coat, the thick coat layer is existent on the surface of the cell wall as a whole by physical adsorption, so that it is substantially peeled off by the above cleaning.

On the contrary, in the invention, alumina thinly covers the surface of each SiC particle and forms a chemical bond to Si fed from SiC to closely adhered to each of the particles, so that the adhesion property is high and hence the resistance to cleaning is high and the durability as the film is strong.

Figure 5:
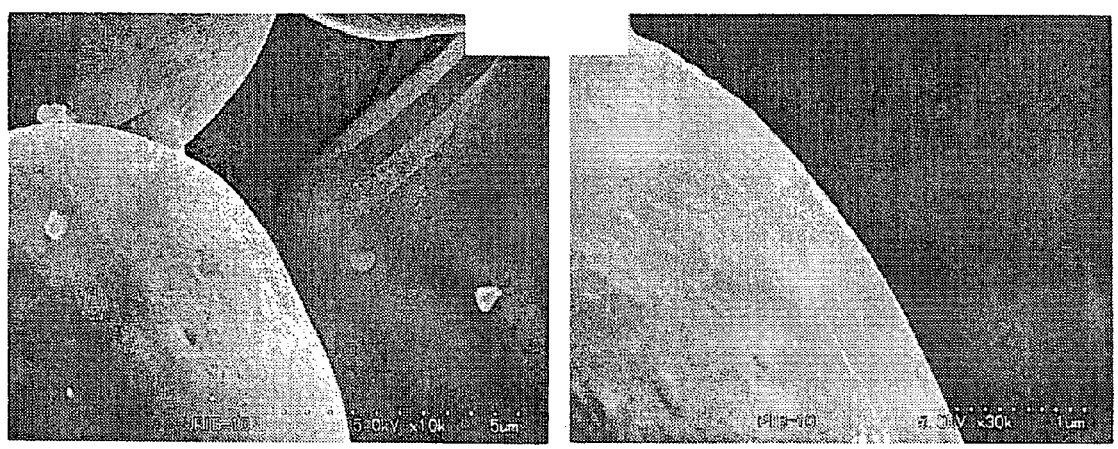
FIG. 5 is an electron microphotograph showing a particle structure of a catalyst carrier.
Figure 5:
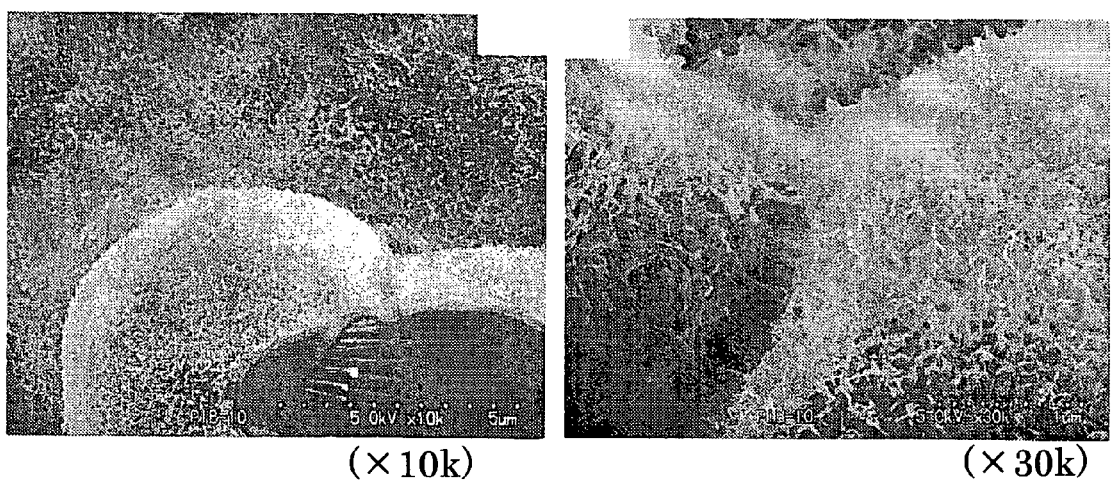

FIG. 5 shows a comparison between an electron microphotograph (×10K), (×30K) when the surface of the SiC particle is covered with alumina thin film according to the invention and an electron microphotograph (×10K), (×30K) when the surface of the cell wall is covered with alumina film according to the conventional technique. In the invention, it is clearly seen that needle-like (fine fibrous) alumina is bristled on the surface of each SiC particle to indicate the transplantation structure as shown in FIG. 3(c) at first sight.

Such a structure of the alumina thin film required in the invention, i.e., the crystal structure of the alumina thin film formed by covering the surface of each SiC particle or the like contains at least one of $\gamma$-$Al_2O_3$, $\delta$-$Al_2O_3$ and $\theta$-$Al_2O_3$ and fine fibrous protruding alumina constituting the alumina thin film has a structure that a diameter is 2–50 nm, and a length is 20–300 nm, and a ratio of full length/diameter is 5–50. And also, it is favorable that the thickness of the thin film is not more than 0.5 $\mu m$ and the specific surface area of alumina is 50–300 $m^2/g$. The term "thickness of alumina thin film" used herein is an average of a distance from the surface of SiC particle to a most apart portion of fine fibrous protruding alumina from SiC particle surface. Moreover, the diameter of alumina is desirable to be 5–20 nm, and the aspect ratio (full length/diameter ratio) is desirable to be 10–30.

The reason why the properties of the fine fibrous protruding alumina thin film are limited to the above is based on the fact that when the length of the fine fibrous protruding alumina is less than 20 nm, it is difficult to ensure the surface area, while when it exceeds 300 nm, the structure becomes brittle. And also, when the diameter is less than 2 nm, it is equal to or less than the size of the catalyst such as noble metal or the like and does not act as a carrier layer, while when it exceeds 50 nm, it is difficult to ensure the desired specific surface area. Furthermore, when the aspect ratio is less than 5, it is difficult to ensure the required specific surface area, while when it exceeds 50, the structure becomes brittle and there may be caused a case that the fine fibrous protrusions are bent by the cleaning operation or the like.

And also, the reason why the specific surface area of the alumina thin film is restricted as mentioned above is due to the fact that when it is less than 50 m$^2$/g, the sintering of the fine fibrous protruding alumina excessively progresses and the durability is poor. While, when the specific surface area exceeds 300 m$^2$/g, the fine fibrous protruding alumina becomes too fine and does not act as so-called carrier layer or the structure becomes brittle. Moreover, the preferable specific surface area is within a range of 50–200 m$^2$/g.

Next, the amount of the alumina thin film as a carrier film in the catalyst carrier according to the invention is 0.5–15 wt % as an alumina ratio. When it is less than 0.5 wt %, the effect of improving the heat resistance is small, while when it exceeds 15 wt %, the pressure loss increases and the filter function lowers. More preferably, it is 1–4 wt %.

And also, the content of silicon when the carrier in the catalyst carrier according to the invention is porous silicon carbide is preferable to be 0.01–10 wt %. When the silicon content is less than 0.01 wt %, the ability of feeding Si is deficient and the effect of improving the heat resistance is less, while when the silicon content exceeds 10 wt %, the strength of the honeycomb filter lowers. Such a silicon content is favorable to be 0.01–10 wt % in the other silicon containing ceramics for the same reason as mentioned above, preferably 0.01–5 wt %, more particularly 0.01–2 wt %.

The production method of the catalyst carrier is described below.

The characteristic of the production method according to the invention lies in a point that the alumina thin film is formed on the catalyst carrier by sol-gel process, particularly the surface of the each ceramic particle such as SiC or the like forming the cell wall is individually covered with the alumina thin film and calcined and subjected to a treatment with hot water to modify the alumina thin film into such a thin film that the microstructure section indicates the transplantation structure of bristling fine fibers of alumina.

Each step is explained in detail below.

a. Preliminary Treating Step

This step is a heating treatment at 800–1600° C. for 5–100 hours for oxidizing the surface of each silicon-containing ceramic particle such as SiC or the like to supply Si amount in order to promote chemical bond to alumina. Of course, this step may be omitted if sufficient oxide film is existent on the surface of the above ceramic particle. For example, the SiC sintered body itself contains about 0.8 wt % of SiO$_2$. They are existent on the surface of SiC or intergranular face thereof, so that the supply of SiC is easily guessed. Further, there is also a purpose in the increase of SiO$_2$ to improve the heat resistance. In this case, it is desirable to heat in an oxidizing atmosphere at 800–1600° C. for 5–100 hours. When the temperature is lower than 800° C., the oxidation reaction hardly occurs, while when it exceeds 1600° C., the oxidation reaction proceeds too much and the strength of the filter is lowered. The recommended conditions are 1000–1500° C. and 5–20 hours. If this condition is satisfied, SiO$_2$ sufficient to supply Si can be formed on the surface, and the porosity and pore size of the filter are unchangeable and hence the pressure loss characteristic is not damaged.

b. Solution Impregnating Step

This step is a treatment that the surface of each ceramic particle constituting the cell wall is covered with the thin film of alumina by impregnating a solution of aluminum containing metal compound through sol-gel process.

In the preparation of the solution of the above aluminum containing metal compound, there are a metal inorganic compound and a metal organic compound as a starting metal compound. As the metal inorganic compound are used Al(NO$_3$)$_3$, AlCl$_3$, AlOCl, AlPO$_4$, Al$_2$(SO$_4$)$_3$, AlPO$_4$, Al$_2$(SO$_4$)$_3$, Al$_2$O$_3$, Al(OH)$_3$, Al and the like. Among them, Al(NO$_3$)$_3$ and AlCl$_3$ are preferable because they are easily dissolved in a solvent such as alcohol, water or the like and is easy in the handling.

As an example of the metal organic compound, there are a metal alkoxide, a metal acetylacetonate and a metal carboxylate. Concretely, there are Al(OCH$_3$)$_3$, Al(OC$_2$H$_3$)$_3$ and Al(iso-OC$_3$H$_7$)$_3$ and the like.

As the solvent, at least one of water, alcohol, diol, polyvalent alcohol, ethylene glycol, ethylene oxide, triethanolamine, xylene and the like is used considering the dissolution of the above metal compound.

And also, hydrochloric acid, sulfuric acid, nitric acid, acetic acid or hydrofluoric acid may be added as a catalyst in the preparation of the solution. Furthermore, it is effective to add Li, K, Ca, Sr, Ba, La, Pr, Nd, Si or Zr or a compound thereof to the starting material in order to improve the heat resistance of alumina.

In the invention, Al(NO$_3$)$_3$ may be mentioned as a recommended metal compound. Because, it is dissolved in the solvent at a relatively low temperature and can prepare the starting solution. And also, 1, 3 butane diol is recommended as the solvent. A first reason is due to the fact that the viscosity is appropriate and can form a gel film having a proper thickness on SiC particle at a gel state. A second reason is due to the fact that this solvent forms a metal alkoxide in the solution and can form a precursor for a metal oxide polymer consisting of oxygen-metal-oxygen bond, i.e. a metal oxide gel.

The amount of Al(NO$_3$)$_3$ is desirable to be 10–50 wt %. When it is less than 10 wt %, the amount of alumina having such a surface area that the activity of the catalyst is maintained for a long time can not be carried, while when it exceeds 45 wt %, the quantity of heat generation becomes large in the dissolution and the gelation is easily caused.

Moreover, the temperature in the preparation of the impregnation solution of the aluminum containing metal compound is desirable to be 50–130° C. When it is lower than 50° C., the solubility of the solute is low, while when it exceeds 130° C.; the reaction rapidly progresses to cause the gelation and the solution can not be used as a coating solution. The stirring time is desirable to be 1–9 hours. The viscosity of the solution becomes stable within such a range.

In order to spread the thus adjusted metal compound solution into all pores as a space between the ceramic particles in the cell wall, there may be adopted, for example, a method wherein the catalyst carrier (filter) is placed in the container and the metal compound solution is filled therein and then deaerated, a method wherein the solution is flowed into the filter on one hand and deaerated on the other hand, and the like. In this case, an aspirator, vacuum pump and the like may be used as a deaerating device. That is, air is removed off from the pores in the cell wall to fully spread the solution of the above metal compound onto the surface of each ceramic particle.

c. Drying Step

This step is a treatment that volatile component such as $NO_2$ or the like is evaporated off to gelate the solution to thereby adhere to the surface of each ceramic particle and at the same time extra solution is removed, which is carried out by heating at 120–170° C.×about 2 hr. When the heating temperature is lower than 120° C., the volatile components hardly evaporate, while when it exceeds 170°, the thickness of the gelated film becomes ununiform.

d. Calcining Step

This step is a calcining treatment that the residual component is removed to form amorphous alumina, which is desirable to be carried out by heating to a temperature of 300–500° C. When the calcining temperature is lower than 300° C., it is difficult to remove the residual organic substance, while when it exceeds 500° C., $Al_2O_3$ is crystallized and the fine fibrous protruding boehmite can not be formed by a subsequent hot water treatment.

e. Hot Water Treating Step

This step is a treatment for shaping the structure of the given alumina thin film. In this treatment, immediately after the calcined catalyst carrier is immersed in water, the particles on the surface of the amorphous alumina thin film are discharged in the solution at a sol state by deflocculating action and also boehmite particles produced by hydration are aggregated at fine fibrous protruding state and rendered into a stable state against the deflocculation.

That is, the alumina thin film adhered to the surface of the each ceramic particle is bristled as fine fibrous form (needle-like particles) by the hot water treatment to form a thin film of rough surface indicating so-called transplantation structure. Therefore, the thin film has a higher specific surface area. In general, in the sintering of alumina, the surface diffusion mainly progresses and is subjected to a phase transformation into α-alumina, at which the specific surface area is rapidly decreased. However, when silica is caught into the alumina particle, it is considered that the silica clogs with the pore site of alumina in the course of the heat treatment or moves into the needle-like particle surface to control the surface diffusion or the sintering between the particles. Therefore, viscous flowing mechanism based on the sintering from contact point between the needle-like particles is preferential at an initial sintering of the carrier, but it is considered that silica shuts the mass transfer path between the needle-like particles to obstruct the transformation of α-alumina at the last stage and hence the sintering does not progress and the high specific surface area is maintained.

The temperature in the above hot water treatment is desirable to be 50–100° C. When the temperature is lower than 50° C., the hydration of the amorphous alumina thin film does not progress and the fine fibrous protruding boehmite is not formed. While, when it exceeds 100° C., water evaporates and it is difficult to maintain the step for a long time. The treating time is desirable to be not less than one hour. When it is less than one hour, the hydration of alumina becomes insufficient.

f. Firing Step

This step is a treatment that the boehmite produced by hydration is shaped into alumina crystal. The firing temperature is favorable to be 500–1000° C. and the time is 5–20 hours. When the temperature is lower than 500° C., the crystallization does not progress, while when it exceeds 1000° C., the sintering excessively progresses and the surface area tends to be lowered.

EXAMPLES

Catalyst carriers produced under conditions shown in Table 1 (Invention Examples 1, 2, Comparative Example 1) are attached to a particulate filter (DPF) in an exhaust gas cleaning device of a diesel vehicle to conduct a cleaning test. In this test, the pressure loss characteristic, heat resistance and resistance to cleaning are investigated to obtain results as shown in the same table and FIGS. 4 and 5.

TABLE 1

Figure 6:
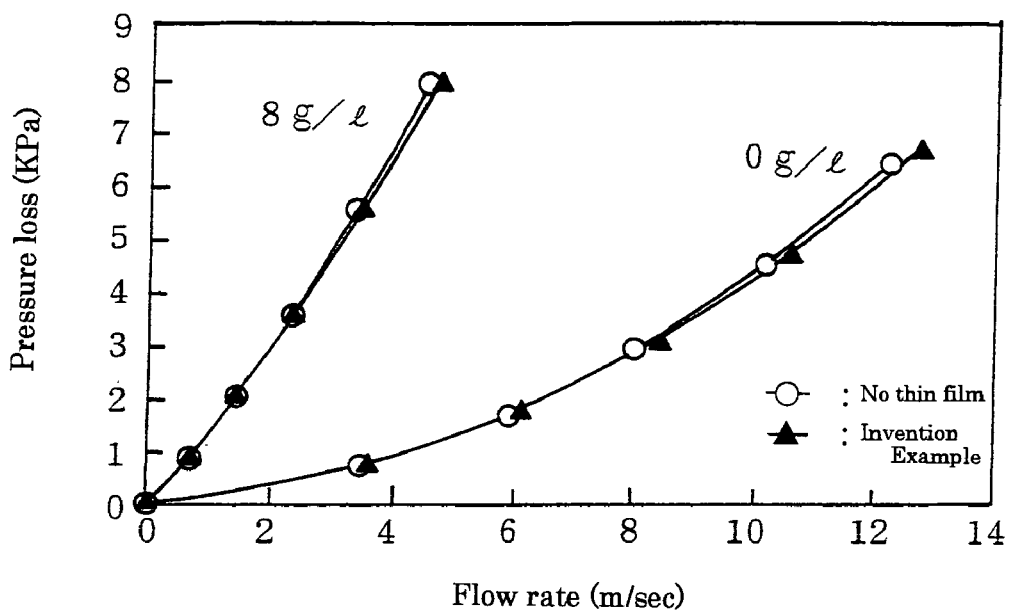
FIG. 6 is a graph showing a pressure loss characteristic in an example.
Figure 7:
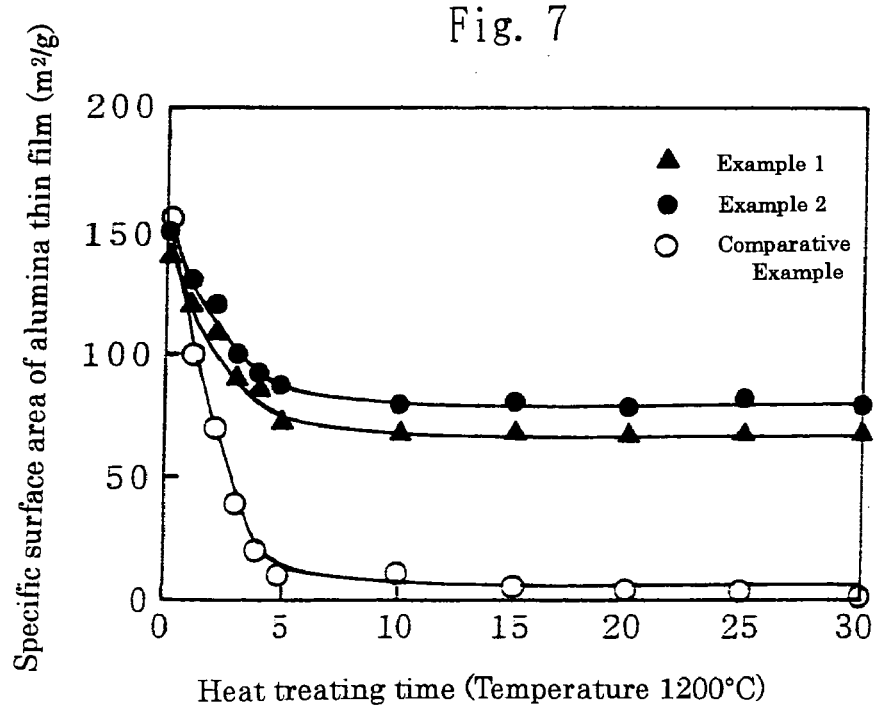
FIG. 7 is a graph showing a heat resistance of an alumina coat in an example.

|  | Example 1 | Example 2 | Comparative Example 1 |
| --- | --- | --- | --- |
| Honeycomb carrier | SiC filter | SiC filter | SiC filter |
| Alumina carrying coat | impregnation | impregnation | wash coat |
| Pretreatment of filter | none | 1100° C., 20 hr | none |
| $SiO_2$ amount | 0.2 wt % | 3 wt % | 0.2 wt % |
| (Si amount) | (0.11 wt %) | (1.0 wt %) | (0.11 wt %) |
| $Al_2O_3$ amount | 3.2 wt % | 3.0 wt % | 3.1 wt % |
| Alumina thin film |  |  |  |
| diameter | 10 nm | 6 nm | — |
| length | 150 nm | 120 nm | — |
| full length/diameter | 15 | 20 | — |
| Pressure loss characteristic |  | FIG. 6 |  |
| Heat resistance |  | FIG. 7 |  |
| Resistance to cleaning | no peeling at 70 Kg/cm² | no peeling at 80 Kg/cm² | almost peeling at 10 Kg/cm² | a. As shown in FIG. 6, the invention example shows substantially the same pressure loss characteristic as in the case of no thin film prior to the deposition of particulate (floating particular substance: PM), but the pressure loss is considerably small as compared with Comparative Example 1 when the same gas is passed after the deposition.

b. As shown in FIG. 7, Examples 1 and 2 are small in the lowering of the specific surface area of alumina and excellent in the heat resistance as compared with Comparative Example 1 when the heat treatment is carried out at the same temperature.

c. And also, Examples 1 and 2 are considerably large in the cleaning resistance as compared with the comparative example.

Moreover, FIG. 5 shows electron microphotographs (×10K, ×30K) of particle structure in the cell wall of the filter of Example 1 and that having no alumina coat. The alumina thin film according to the invention shows the transplantation structure of bristling fine fibers.

INDUSTRIAL APPLICABILITY

As mentioned above, according to the invention, there can be provided a catalyst carrier for the purification of exhaust gas from an automobile having a small pressure loss, an excellent heat resistance and a good resistance to cleaning and realized an establishment of an advantageous production technique therefor. Particularly, it is favorable as a catalyst carrier for cleaning the exhaust gas from the diesel engine.

What is claimed is:

1. A catalyst carrier, wherein the carrier comprises particles of a silicon-containing ceramic material and each of these particles is covered by a film of alumina, wherein the film of alumina has a specific surface area of 50–300 m²/g and a microscopic view thereof indicates a bristled transplant structure comprising fibers having a diameter of from 2 nm to 50 nm, a length of from 20 nm to 300 nm and a ratio of length/diameter of from 5 to 100.

2. The catalyst carrier of claim 1, wherein the silicon-containing ceramic material comprises a non-oxide silicon ceramic.

3. The catalyst carrier of claim 2, wherein the non-oxide silicon ceramic material comprises at least one of silicon carbide and silicon nitride.

4. The catalyst carrier of claim 1, wherein the silicon-containing ceramic material comprises an oxide silicon ceramic.

5. The catalyst carrier of claim 4, wherein the oxide silicon ceramic comprises at least one of sialon, mullite and cordierite.

6. The catalyst carrier of claim 1, wherein the carrier comprises at least one of a porous body, a fiber-shaped body and a pellet-shaped body.

7. The catalyst carrier of claim 1, wherein the carrier comprises a honeycomb-shaped porous sintered body of silicon carbide.

8. The catalyst carrier of claim 1, wherein the silicon-containing ceramic material comprises a layer of $SiO_2$ on a surface thereof.

9. The catalyst carrier of claim 8, wherein the amount of $SiO_2$ in the carrier is from 0.001% to 20% by weight.

10. The catalyst carrier of claim 1, wherein the alumina film is present in the carrier in an amount of from 0.1% to 15% by weight, based on the carrier and expressed as alumina.

11. A catalyst carrier, wherein the carrier comprises particles of a silicon-containing ceramic material and each of these particles is covered by a film of alumina, and wherein the silicon-containing ceramic material comprises a layer of $SiO_2$ on a surface thereof, an amount of $SiO_2$ in the carrier being from 0.001% to 20% by weight.

12. The catalyst carrier of claim 11, wherein the silicon-containing ceramic material comprises a non-oxide silicon ceramic.

13. The catalyst carrier of claim 12, wherein the non-oxide silicon ceramic material comprises at least one of silicon carbide and silicon nitride.

14. The catalyst carrier of claim 11, wherein the silicon-containing ceramic material comprises an oxide silicon ceramic.

15. The catalyst carrier of claim 14, wherein the oxide silicon ceramic comprises at least one of sialon, mullite and cordierite.

16. The catalyst carrier of claim 11, wherein the carrier comprises at least one of a porous body, a fiber-shaped body and a pellet-shaped body.

17. The catalyst carrier of claim 11, wherein the carrier comprises a honeycomb-shaped porous sintered body of silicon carbide.

18. The catalyst carrier of claim 11, wherein the alumina film is present in the carrier in an amount of from 0.1% to 15% by weight, based on the carrier and expressed as alumina.

* * * * *